Figure 1:
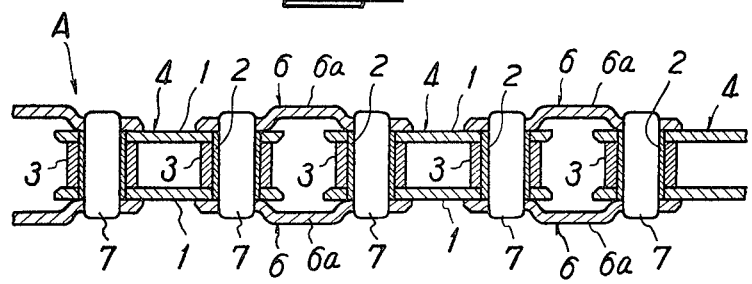

United States Patent [19]
Nagano

[11] 4,102,216
[45] Jul. 25, 1978

[54] DRIVING CHAIN FOR BICYCLES

[75] Inventor: Masashi Nagano, Sakai, Japan

[73] Assignee: Shimano Industrial Company Limited, Osaka, Japan

[21] Appl. No.: 748,144

[22] Filed: Dec. 6, 1976

[30] Foreign Application Priority Data

Dec. 29, 1975 [JP] Japan .................. 51-180311[U]

[51] Int. Cl.² .......................................... F16G 13/02
[52] U.S. Cl. .................. 74/245 R; 74/250 R
[58] Field of Search .................. 74/245 R, 250 R

[56] References Cited

U.S. PATENT DOCUMENTS

| 3,242,752 | 3/1966 | Acri | 74/245 R |
| 3,835,721 | 9/1974 | Hoffstetter | 74/245 R |

FOREIGN PATENT DOCUMENTS

| 162,521 | 1/1946 | Belgium | 74/245 |
| 953,514 | 12/1949 | France | 74/245 |

*Primary Examiner*—Leonard H. Gerin
*Attorney, Agent, or Firm*—Stevens, Davis, Miller & Mosher

[57] ABSTRACT

A driving chain for a bicycle, which serves to transmit the driving force by pedalling from front chain sprockets to rear chain sprockets, in which each of the outer link plates is partially expanded to the extent that each pin connecting outer link plates with inner link plates respectively comes out of the outside of the outer link plate, so that each of the expanded portions, when the driving chain is shifted by a derailleur, may be in contact with teeth of the sprockets.

2 Claims, 6 Drawing Figures

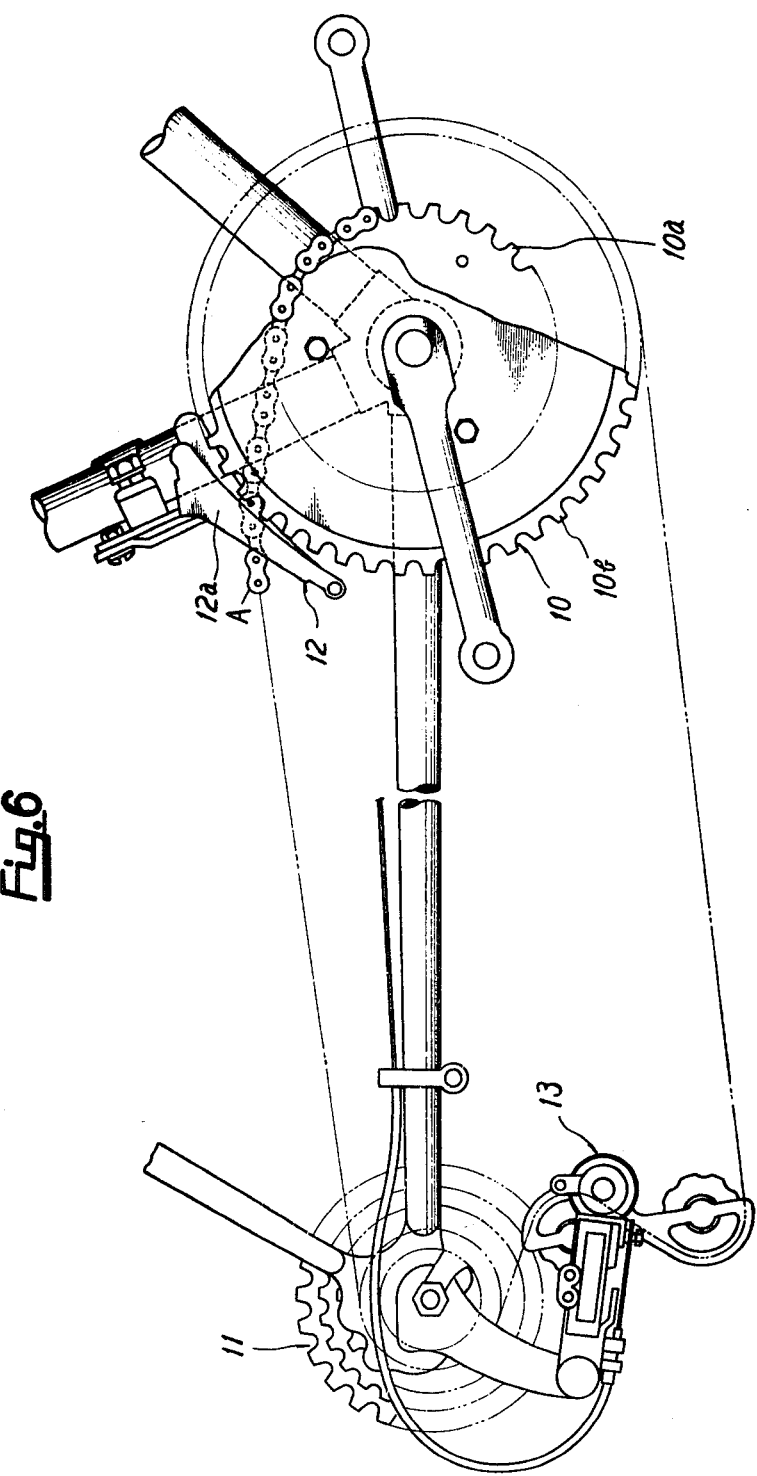

DRIVING CHAIN FOR BICYCLES

The invention relates to a driving chain for a bicycle and more particularly to the driving chain which is adapted to transmit the driving force by pedalling from one or more front chain sprockets mounted to a crank shaft to one or more rear chain sprockets mounted to a rear wheel hub, thereby driving the rear wheel.

Generally, this kind of driving chain is composed of inner link plates, outer link plates and pins connecting both ends of both the outer and inner link plates respectively.

The driving chain A, as shown in FIG. 6, put on multistage front chain sprockets 10 mounted to the crank shaft and multistage rear chain sprockets 11 to the rear wheel hub, is at the tension side thereof substantially axially of the sprockets by means of derailleurs 12 and 13. The multistage front chain sprockets 10 differ greatly in the number of teeth on each sprocket for example, a minumum of 36 teeth to a maximum of 50, so that the bicycle may run lightly even on a slope. Hence, when shifted especially, from the low speed sprocket to the high speed sprocket, the chain partially remains in contact with the teeth of the low speed sprocket at the slack side thereof, while, at the tension side the chain is shifting toward the high speed sprocket resulting in its obliquely travelling across the two sprockets.

The chain, however, has pins projecting at both ends thereof outward from the outer surface of outer link plates respectively, which creates problems in that the chain, when slightly over-shifted toward the high speed sprocket, causes noises by contact of the pin end with the teeth, and is, when further over-shifted, caught at the pin ends to be raised by the teeth of the sprockets. As a result, the chain does not shift smoothly and it makes for poor speed change efficiency and violent noises as well.

Another problem is that the chain in its shifting is forced to be biased against the high or low speed sprocket by means of the derailleur so that frictional resistance is generated between a chain guide 12a of the derailleur 12 and the pin ends, thereby increasing wear of the chain guide. In other words, the pin ends which are slightly rounded resulting from caulked connection of the inner and outer link plates, expose much less contacting areas to the chain guide surface thereby leading to encroachment thereto.

The invention has been designed to eliminate the aforesaid defects. An object of the invention is to provide a driving chain for bicycle, which is smoothly contactable at its lateral side with the teeth of sprockets in mesh therewith when shifted across sprockets having different numbers of teeth, especially, from the low speed sprocket to the high speed sprocket at the front chain sprocket. Multistage front sprockets differ greatly in the number of teeth therebetween, or from the high to the low at the rear chain sprockets, as well as from the high speed sprocket to the low speed sprocket at the rear chain sprockets, thereby improving the speed change efficiency, reducing the noise level, and further increasing the contacting area with the chain guide to reduce the wear of the chain guide in a speed-change especially across the front chain sprockets. The aforesaid problems have been solved by partially expanding each of the outer link plates to the extent that the pins connecting the outer and inner link plates come out from the outer link plate surfaces.

Figure 2:
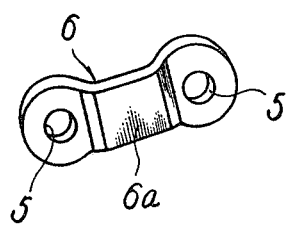
Figure 3:
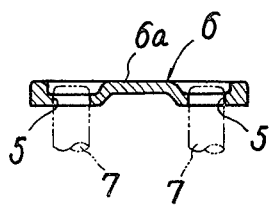
Figure 4:
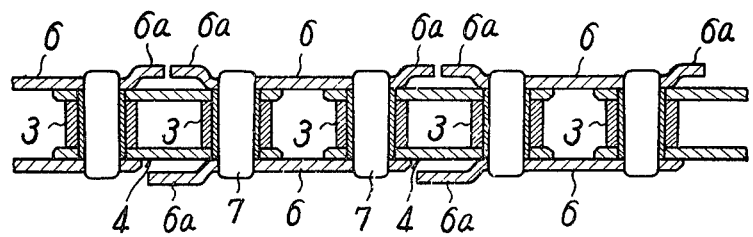
Figure 5:
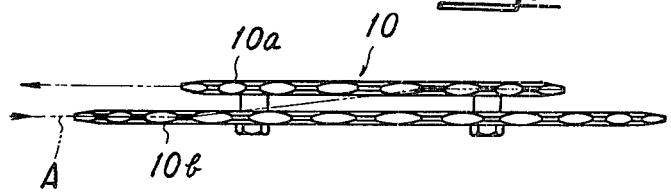

The aforesaid objects of the invention and others will be apparent from the following description in accordance with accompanying drawings, in which FIG. 1 is a partially longitudinally sectional view of a driving chain of an embodiment of the invention, FIG. 2 is a perspective view of only an outer link plate of the driving chain in FIG. 1, viewed from outside thereof, FIG. 3 is a longitudinally sectional view of only the outer link plate of a modified embodiment of the invention, FIG. 4 is a partially longitudinally sectional view of another modified embodiment of the invention, FIG. 5 is an illustration showing how the chain is shifted by the derailleur, and FIG. 6 is a partially side view showing application of the chain of the invention to the bicycle.

In the drawings, the reference letter A is a driving chain put on multistage front chain sprockets 10 mounted to the crank shaft and multistage rear chain sprockets 11 mounted to the rear wheel hub. The driving chain shown in FIG. 1 comprises: linkages 4 formed of two opposite inner link plates 1 uniformly spaced apart having cylindrical bushes 2 mounted at both ends of the inner link plates respectively, and rollers 3 movably sleeved onto the bushes 2 respectively. Outer link plates 6 having pin holes 5 are spaced similarly to those of the bushes 2 and inner link plates 1 and are positioned outside of the inner link plates respectively. Pins 7 are inserted into the pin holes 5 and bushes 2 and caulked at both ends to connect the inner link plates 1 and the outer link plates 6. The linkages 4 are connected in alignment and ringed at both ends thereof with the outer link plates and pins respectively.

As an alternative the chain, which has bushes 2 carrying rollers 3, may have pins 7 carrying the rollers 3, or only bushes 2 without the rollers 3.

In the chain as aforesaid, the invention is directed to outwardly expanding the outer link plates in excess of the end faces of pins 7 coming out of the outer surfaces of outer link plates so that flat expanded portions 6a may be formed.

The expanded portions 6a with pinholes 5 at longitudinal both ends of the outer link plates 6 are molded in a press or by other means, and located, as shown in FIG. 2, at wholly intermediate portions between the bores 5.

It also is possible that the portions 6a may be expanded to be formed throughout the plate except for the pin holes 5 as shown in FIG. 3, or between the pin holes 5 except for widthwise edges of the plates 6 (not shown). Also the plates 6 may, as shown in FIG. 4, be outward bent at both ends thereof except for the pin holes 5.

The expanded portion of each of the outer link plates 6, which protrudes beyond the pin hole 5, head comes out of the plate 6 outer surface, is allowed to contact the teeth of the high speed sprocket and the chain guide 12a of front derailleur 12 when the driving chain is shifted, for example, from the low speed sprocket to the high speed sprocket.

In construction as shown in FIG. 6, the driving chain A, when shifted by the derailleur 12 from the low speed sprocket 10a to the high speed sprocket 10b is overshifted to bring the expanded portions 6a of one side of chain A in contact with the teeth of high speed sprocket 10b. In this instance, the teeth slide along the swollen portion surface 6a in the absence of the chain rise caused by the contact therewith so as to be meshable with the next tooth without any hindrance. As a result, the speed change efficiency can be improved and also noise from the contact can be reduced.

Furthermore, the chain guide 12a, which, when the chain is shifted, contacts the one expanded side portion 6a of outer link plate 6 of chain A, increases its contacting area to result in reducing the wear of chain guide 12a in comparison with the conventional.

In addition, it is most preferable to form the expanded portions 6a at the plates 6 throughout the area between the pin holes 5 as shown in FIG. 2. In other words, the outwardly expanded outer link plates 6 can be widely widthwise spaced so that when the outer surface of the expanded portions 6a are contacted with the teeth of a sprocket to which the chain is shifted the teeth may easily slidably enter the space between the oppositely expanded portions 6a, whereby the speed change efficiency is improved to that extent and no overshift is required.

In addition, the aforesaid description not only pertains to the front chain sprockets, but also to the rear chain sprockets.

As apparent from the aforesaid description, the driving chain of the invention can be made simple in construction and also the chain is smoothly slidable in contact with the teeth of a larger diameter sprocket when shifted from the sprocket smaller in diameter and number of teeth to that sprocket larger in diameter and number of teeth.

Furthermore, the chain is, when shifted, made wider in its contacting area especially between the chain and the chain guide at the front chain sprockets so that the chain guard may be considerably reduced in its wear compared with the conventional one where only the pin heads come in contact with the chain guard. In addition, each of the outer link plates may be expanded only to the extent that the plate projects in excess of the pin head. A long chain, which is obtainable of the objects of the invention where even some of the expanded outer link plates are lower than the pin heads, may of course be within the technical scope of the invention.

While an embodiment of the invention has been shown and described, the invention is not limited to the specific construction thereof, which is merely exemplified in the specification.

What is claimed is:

1. A driving chain for a bicycle, which transmits a driving force by pedalling from front chain sprockets to rear chain sprockets, comprising a plurality of inner link plates defining bush holes, a plurality of outer link plates defining pin holes and pins connecting the outer and inner link plates lengthwise through said holes, said pins projecting at axially both ends thereof outwardly from the outer surface of the outer link plates, said outer link plates being expanded outwardly at the intermediate portions between a pair of pins at both ends lengthwise of said outer link plates to the extent that said pins project from the outer surface of said outer link plates, so that the expanded portions are contactable with the teeth of an adjacent sprocket and said outer link plates in relation of being opposite to each other are enlarged at the inner distance therebetween.

2. The driving chain of claim 1, wherein said expanded portions are formed throughout the surface of the outer link plates except for said pin holes.

* * * * *